UNITED STATES PATENT OFFICE.

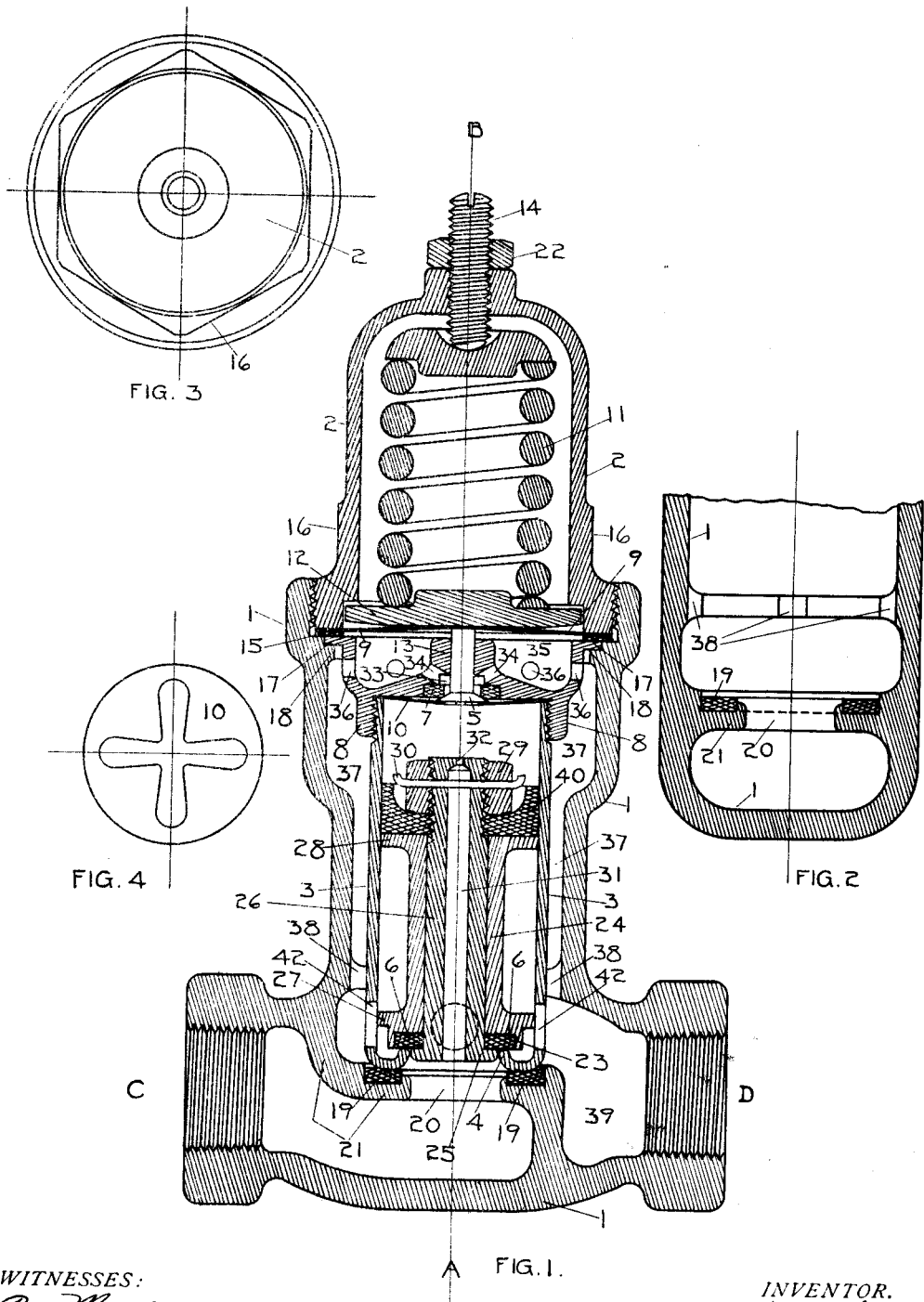

ARTHUR W. CASH, OF DECATUR, ILLINOIS.

PRESSURE REDUCING AND REGULATING VALVE.

1,180,108.  Specification of Letters Patent.  Patented Apr. 18, 1916.

Application filed July 13, 1915. Serial No. 39,703.

*To all whom it may concern:*

Be it known that I, ARTHUR W. CASH, a citizen of the United States, residing at Decatur, in the county of Macon and State of Illinois, have invented certain new and useful Improvements in Pressure Reducing and Regulating Valves, as shown and set forth in the drawings and specification annexed hereto.

My invention relates to improvements in that class of pressure reducing and regulating valves commonly used to control and regulate the pressure of fluids flowing through pipes or conduits, and more especially to a class of regulating valves commonly known as "auxiliary" operated, in which the excess pressure on the inlet side of the valve is utilized to operate, or open and close, the restricting valve or disk in relation to port, or opening, in a dividing partition, or wall, which separates the inlet and outlet sides, or chambers, of the valve body proper, through which port the fluid is caused to flow. In numerous other constructions of valves for this purpose as heretofore made, the reduced and regulated delivery pressure is controlled by some form of diaphragm, or an equivalent piston, against one side of which the reduced delivery pressure acts, while this delivery pressure is counteracted on the opposite side of the piston or diaphragm, by an adjustable spring or weighted means, the desired degree of delivery pressure being obtained by adjustment of the spring or weighted means, this diaphragm, or its piston equivalent, controlling the main valve disk and port through some form of mechanical connection, or contact between the diaphragm or piston, and the main valve disk.

In an auxiliary operated valve of the type here shown, while a diaphragm and an opposing spring are also used, the diaphragm is not in mechanical connection to the main valve disk; therefore, the reduced delivery pressure acting against the diaphragm, cannot control or operate the main valve disk, except through the medium of a portion of the fluid being controlled by a small secondary or auxiliary valve.

The desired objects as just last explained, are accomplished by the mechanism shown in the drawings and specification annexed hereto, in which—

Figure 1 is a vertical central section in the direction of the main fluid flow. Fig. 2 is a vertical section of a portion of the main body on the line A—B taken at right angle to the section shown in Fig. 1. Fig. 3 is a top plan view. Fig. 4 is a plan view of a flat sheet metal spring normally seating the secondary, or auxiliary valve.

Similar reference numerals refer to similar parts throughout the several views and figures.

The main body casing, 1, as well as the top diaphragm and spring chamber casing 2, are preferably made of some strong, inexpensive material such as ordinary cast iron, which however, would not be suitable for the seating portion, and other interior operating parts subjected to the corroding action of various fluids, as well as the eroding action of the same fluids passing through the seat and ports at the necessary high velocities to obtain required reductions in pressure. The piston cylinder 3, with its seating portion 4, and the secondary, or auxiliary valve 5, being subject to rapid erosion owing to the very high velocities under which they are frequently required to operate, are therefore, preferably made of a higher grade, and more expensive material, and as they oftener require renewal, it is desirable that they be capable of being quickly replaced as well as having the least amount of expensive material, which purposes are accomplished by the construction shown. The main seat disk 6, and the secondary or auxiliary seat disk 7 are preferably made of some semi-hard, yielding fibrous, material to insure shutting tightly on various kinds of fluid, and as they are subjected to the greatest amount of wear, they must also be made in such manner as to be quickly, and inexpensively replaced when worn.

The cylinder cap, 8, has an annular recess on its under side into which the auxiliary seat disk 7 is tightly pressed, and is also provided with a central circular hub, 13, on its upper side which has a central bore to receive, and to guide the stem of auxiliary valve 5, the top of the central hub 13, also serving as a limit stop for the diaphragm 9, which diaphragm, is preferably composed of one, or a plurality, of thin resilient metal sheets of circular form. The piston cylinder cap, 8, is provided with a circular rim on its lower side, screw threaded, to receive the top portion of piston cylinder 3, the circular shaped thin metal spring, 10, with its inwardly projecting blades is held in place between the upper end of cylinder 3, and cylinder cap 8, this spring serving to normally hold the auxiliary valve 5, in a closed position against the seat disk 7, as long as the diaphragm 9, is held in its uppermost position by the action of the reduced fluid pressure against the underside of the diaphragm. The spring 11, acting through the pressure plate 12, on upper side of diaphragm 9, tends to force the diaphragm downward toward the limit stop on the central hub 13, of cylinder cap 8, whenever the reduced delivery pressure is insufficient, or below the predetermined point for which the spring 11, has been adjusted by means of adjusting screw 14. Diaphragm 9, is held between the screw threaded portion of body casing 1, and spring chamber casing 2, and is made fluid tight on its under side by the soft gasket 15. The under side of diaphragm 9, always being in contact with the upper end of stem on auxiliary valve 5, forces the latter down and opens the valve seat whenever the reduced delivery pressure is below the pre-determined point for which spring 11, has been adjusted. By means of the hexagon portion 16, of spring chamber casing 2, the latter is forced down tightly on diaphragm 9, and soft gasket 15, which action also holds the outer circular flange 17, of cylinder cap 8, tightly in position against annular shoulder 18, of body casing 1, while cylinder cap 8, through piston cylinder 3, holds the lower end of the latter in fluid tight position against the gasket ring 19, which rests in an annular groove around main valve port 20, in division wall 21, between the inlet, and outlet chamber portions of main body casing 1. Gasket ring 19, is made of any suitable soft or yielding material and of suitable thickness to make an impervious joint between division wall 21, and lower portion of piston cylinder 3. Lock nut 22, is provided to prevent adjusting screw 14, from changing its adjustment under the possible action of vibration.

Main seat disk 6, is held in the circular recessed portion, 23, of the piston body 24, by means of the head 25, on bolt 26, the latter passing up centrally through piston body 24. Piston body 24, is provided with a lower guide flange 27, and upper guide flange 28. On top side of the guide flange 28, a piston cup 40, of soft rubber, or other suitable material is provided and held in position over the upper end of bolt 26, by a screw threaded nut 29, which nut is prevented from loosening or backing off by means of the pin 30. The bolt 26, has a large hole 31, passing up through its center to within a short distance from its upper end, at which point a smaller hole 32, is provided for the passage of the high pressure from the inlet side of the valve, into the upper piston chamber above the soft piston cup.

Just above the auxiliary valve 5, and surrounding it inside of the seat disk 7, is an annular chamber 33, from which a number of ports 34—34, communicate with the larger annular chamber 35, in the upper side of cylinder cap 8, and from the chamber 35, another set of port holes 36—36, communicate with the annular space 37, around the piston cylinder 3, inside of the upper part of main body casing 1, and additional ports, or grooves 38—38, in the lower part of annular space 37, communicate with the reduced and delivery pressure chamber 39, on the outlet end of the valve. The combined area of openings in the plurality of ports 34—34, and also the areas of ports 36—36, as well as the areas of ports, or grooves 38—38, are each very much greater that the area of restricted port 32, and also somewhat larger that the area of opening between the auxiliary valve 5, and its seat disk 7, all for the purpose of permitting the high pressure fluid flowing up through the large port, or hole 31, and the restricted port, or hole 32, to escape through ports 34—34, 36—36, and 38—38, much faster than the fluid can be supplied through restricted port 32, so that whenever auxiliary valve 5, is in its open position, the fluid pressure above the soft piston cup 40, and inside of the piston cylinder 3, will either be the same as the reduced and regulated pressure in chamber 39, on the outlet end D, of the regulator, or at some point intermediate of the reduced and regulated pressure, and the initial or high pressure on the inlet end C, of the regulator.

The operation of the valve is as follows: The amount of compression on spring, 11, having been adjusted in accordance with the pre-determined amount of delivery pressure, the diaphragm 9, will be in its downward position holding auxiliary valve 5, open, then as the fluid enters inlet end C, it will come in forcible contact with main seat disk 6, which if in its closed position, will be forced upward together with piston body 24, and piston cup 40, thereby permitting the fluid to pass through the seat opening and through openings 42—42 into the outlet end chamber 39. Whenever the pressure of the fluid in outlet chamber 39, the annular space 37, and the chamber 35, reaches the predetermined point, it acts on the underside of diaphragm 9, causing it to rise and thereby allow the auxiliary valve 5, to close. Then as the high or initial fluid pressure from the inlet chamber C, is still flowing up through large hole 31, and restricted hole 32, it will very quickly fill the upper inside end of cylinder 3, above piston cup 40, with the inlet or initial pressure, which being greater than the reduced or delivery pressure, and piston cup 40, being of greater area than main seat disk 6, the latter will be forced into closed position against its seat 4, and prevent further flow of high pressure fluid until such time as the reduced or delivery pressure in outlet chamber 39, and under diaphragm 9, is again lowered, or decreased, as by usage. Whenever by usage, or otherwise, the delivery pressure is decreased below the predetermined point, diaphragm 9 is quickly forced downward by the spring 11, and in turn forces auxiliary valve 5 from its seat thereby permitting the excess fluid pressure on upper side of piston cup 40, to flow out through auxiliary seat opening, through the ports 34—34, 36—36, through the annular space 37, and ports 38—38, into the reduced pressure chamber 39, this action again permitting the higher initial pressure to force main valve disk 6, from its seat, and again flow through seat opening and openings 42—42, until the diminished delivery pressure is restored to the predetermined point.

Having described the construction and operation of an improved reducing and regulating valve as set forth I claim:—

1. In a reducing valve having inlet and outlet interiorly chambered casing portions, a dividing wall between said casing portions, a communicating port through said dividing wall, in combination with a valve piston cylinder contained and supported within said outlet chambered casing portion, said valve piston cylinder having a valve seat portion at one end held in impervious contact with said dividing wall surrounding said communicating port, and ports communicating from the inside of said valve piston cylinder adjacent to its valve seat portion into said interiorly chambered outlet portion, a cylinder cap imperviously closing the end of said valve piston cylinder away from the seat portion, a secondary valve port in said cylinder cap communicating to an outer chambered portion of said cylinder cap away from its cylinder side, a spring actuated secondary valve normally closing said secondary valve port, a fluid actuated valve piston within said piston cylinder, said valve piston having a valve disk at its side adjacent to the said valve seat in said cylinder, a piston cup or packing at the end of valve of said valve piston away from the valve disk end, a fluid passage way having a restricted portion through the body of said valve piston whereby fluid pressure from said inlet chamber may flow through, and into the closed portion of said valve piston cylinder adjacent to said cap end, a spring loaded diaphragm adapted to close said outer chambered portion of said cylinder of said cylinder cap, abutting means between said loaded diaphragm and said secondary valve, ports communicating from said outer chambered portion of said cylinder cap into one said interiorly chambered outlet casing portion.

2. In a reducing valve having inlet and outlet interiorly chambered casing portions, a dividing wall between said inlet and outlet chambered portions, a communicating port in said dividing wall, a laterally extended portion from said outlet chamber adapted to receive and fixedly hold a valve piston cylinder, said laterally extended portion of said outlet chambered portion being further adapted to receive and hold a spring loaded diaphragm and suitable means for adjusting load on said diaphragm, in combination with a valve piston cylinder having a valve seat at one end thereof, a cylinder cap adapted to close the end of said valve piston cylinder away from its seat end, a laterally extended flange around said cylinder cap, a chambered portion of said cylinder cap on side away from said valve piston cylinder, a spring loaded diaphragm adapted to be held in impervious contact with the annular flange and closing the outer chambered portion of said cylinder cap, means for holding said diaphragm, said cylinder cap, and said valve piston cylinder with valve seat end of said cylinder in impervious contact with the dividing wall surrounding said communicating port between said inlet and outlet chambered portions, a valve piston within said piston cylinder, a valve disk on the end of said piston adjacent to the valve seat in said cylinder, a piston packing at end of piston away from the valve seat disk, a secondary valve normally closing a secondary valve port through said cylinder cap, abutting means between said secondary valve and said diaphragm for operating said secondary valve.

3. In a reducing valve having inlet and outlet chambers therein, a dividing wall between said chambers, a communicating port between said inlet and outlet chamber through said dividing wall, in combination with a valve piston cylinder having a valve seat at one end and a cap adapted to close the opposite end, said cylinder being contained and suitably supported within the said outlet chamber, with the seat end of said cylinder in impervious contact with dividing wall surrounding the communicating port between said inlet and outlet chambers, a secondary valve port through said cylinder cap, a spring actuated valve slidably mounted and normally closing said secondary valve port, a plurality of ports communicating from inside of said cylinder adjacent to its seat end into said outlet chamber, a fluid actuated seat piston within said cylinder having a seat disk adjacent to, and adapted to imperviously close against the said valve seat in the cylinder, a suitable piston cup or packing on end of said valve piston adjacent to cap end of said cylinder, a suitable fluid passage way with a restricted port through the body of said seat piston whereby the high fluid pressure from the said inlet chamber will normally close the communicating port between said inlet and said outlet chambers, and means controlled by the reduced delivery pressure for causing said secondary valve to open and thereby equalize the fluid pressure within the cylinder above the piston cup, with the reduced pressure is said outlet chamber.

4. In a reducing valve having inlet and outlet chambers therein, a dividing wall between said chambers, a communicating port between said inlet and outlet chambers through said dividing wall, in combination with valve piston cylinder having a valve seat at one end, and a cylinder cap at the end away from the valve seat, said cylinder being contained and suitably supported within said outlet chamber with the seat end of said cylinder in impervious contact with said dividing wall surrounding the communicating port therein, a secondary valve port through said cylinder cap, a spring actuated valve slidably mounted and normally closing said secondary valve port, a fluid pressure chamber on the side of said cylinder cap away from said secondary valve, a spring loaded diaphragm closing said chamber in said cylinder cap, a stem member of said secondary valve abutting said loaded diaphragm, a port communicating from said chamber in said cylinder cap into the said outlet chamber, a plurality of ports communicating from inside of said valve piston cylinder adjacent to its seat end into said outlet chamber, and a fluid actuated seat piston within said cylinder, adapted to close or open the communicating port between said inlet and outlet chambers.

5. In a reducing valve having inlet and outlet chambers, a dividing wall between said chambers, a communicating port between the said inlet and outlet chambers through the said dividing wall, the combination of a valve piston cylinder having a valve seat, said cylinder and valve seat being removably contained within the outlet chamber with the seat portion in impervious contact with the dividing wall surrounding the communicating port between said inlet and outlet chambers.

6. In a reducing valve having inlet and outlet chambers, a dividing wall between said chambers, a communicating port between said chambers through said dividing wall, the combination of a valve piston cylinder having a valve seat, said cylinder and seat being removably contained within the outlet chamber, a packing or sealing ring of a resilient material interposed and making a fluid tight joint between the seat portion of said cylinder and said dividing wall surrounding said communicating port therein.

7. In a reducing valve having inlet and outlet chambers, a dividing wall between said chambers, a communicating port between said chambers through said dividing wall, the combination of a laterally extended portion of said outlet chamber adapted to receive and hold firmly a removable piston cylinder having a valve seat thereon, said valve seat being held in impervious connection with said dividing wall surrounding the communicating port therein between the inlet and outlet chambers, a piston operated valve within said cylinder, means for controlling said piston operated valve together with means for holding said valve piston cylinder within said laterally extended portion of the outlet chamber with the valve seat end of said valve piston cylinder in fluid tight contact with said communicating port through said dividing wall.

8. In a reducing valve a body casing having inlet and outlet chambers therein, a dividing wall between said chambers, a communicating port between said inlet and said outlet chambers through said dividing wall, in combination with a valve piston cylinder having a valve seat, said cylinder being contained, and suitably supported within said outlet chamber, with the valve seat portion of said cylinder surrounding the communicating port and held in impervious contact with said dividing wall, a plurality of ports through the wall of cylinder near its seat portion, said plurality of ports communicating with the said outlet chambers, a piston cap adapted to close the end of the valve piston cylinder opposite its seat end, a secondary valve port through said cylinder cap, a slidably mounted spring actuated valve adapted to normally close said secondary valve port, a fluid actuated valve piston within said cylinder, said valve piston having a valve disk at its end adjacent, and adapted to imperviously close against the seat in said cylinder, a fluid tight piston cup or packing on end of said piston opposite its seat end, and a suitable fluid port through the body of said valve piston, whereby the initial fluid pressure from the said inlet chamber is conveyed to the upper side of said fluid tight piston cup within said valve piston cylinder, together with means for holding said valve piston cylinder within said outer chamber, and also means for operating and controlling said valve piston and valve seat disk, whereby the flow of fluid through said port in said dividing wall is controlled by the fluid pressure within said outlet chamber.

9. In a reducing valve, the combination of a body casing having inlet and outlet chambers, an integral dividing wall between said chambers, a communicating port through said dividing wall, a valve piston cylinder adapted to be held in fixed impervious co tact with said dividing wall surrounding said communicating port, a valve seat in said valve piston cylinder, a valve disk, adapted to imperviously close on said valve seat, together with means for operating said valve disk through the medium of the fluid pressure within said outlet chamber of said body casing.

10. In a reducing valve, a body casing having inlet and outlet chambers, an integral dividing wall between said chambers, a communicating port through said dividing wall, in combination with a removable valve seat adapted to be fixedly held in impervious contact with said dividing wall surrounding said communicating port, a valve piston cylinder connected to and supporting said removable valve seat, said valve piston cylinder adapted to hold and guide a piston actuated valve disk in impervious contact with said valve seat, communicating ports from said piston cylinder into said outlet chamber, a cap on the end of said valve piston cylinder away from its seat end, a secondary valve seat in said cap, a secondary valve to close said secondary valve seat, a chambered portion on outer portion of said cylinder cap, a diaphragm adapted to close said chambered portion in said cylinder cap, and means for holding said diaphragm, said cylinder cap, said cylinder, and said removable valve seat in fluid tight contact with said valve body casing and with said dividing wall with said casing between the inlet and outlet portion thereof.

ARTHUR W. CASH.

Witnesses:
 Roy Moore,
 Elmer F. Lemmon.